(12) United States Patent  (10) Patent No.: US 9,330,276 B2
Banks et al.  (45) Date of Patent: May 3, 2016

(54) CONDITIONAL ROLE ACTIVATION IN A DATABASE

(71) Applicants: Barbara Banks, Berkeley, CA (US); Rajnish Chitkara, Fremont, CA (US)

(72) Inventors: Barbara Banks, Berkeley, CA (US); Rajnish Chitkara, Fremont, CA (US)

(73) Assignee: Sybase, Inc., Dublin, CA (US)

( * ) Notice: Subject to any disclaimer, the term of this patent is extended or adjusted under 35 U.S.C. 154(b) by 187 days.

(21) Appl. No.: 13/729,698

(22) Filed: Dec. 28, 2012

(65) Prior Publication Data

US 2014/0188938 A1    Jul. 3, 2014

(51) Int. Cl.
*G06F 17/30* (2006.01)
*G06F 21/62* (2013.01)

(52) U.S. Cl.
CPC ...... *G06F 21/6227* (2013.01); *G06F 17/30286* (2013.01); *G06F 2221/2117* (2013.01); *G06F 2221/2141* (2013.01)

(58) Field of Classification Search
CPC ............ G06F 17/30; G06F 2221/2141; G06F 2221/2117; G06F 17/30286; G06F 21/6227
USPC ........................................................ 707/783
See application file for complete search history.

(56) References Cited

U.S. PATENT DOCUMENTS

| 7,657,777 | B2* | 2/2010 | Wong | G06F 17/30427 707/770 |
| 7,925,656 | B2* | 4/2011 | Liu | G06F 17/30938 707/714 |
| 7,970,782 | B1* | 6/2011 | Bedell | G06F 17/30592 707/760 |
| 8,065,329 | B2* | 11/2011 | Lei | G06F 17/30442 707/662 |
| 8,140,548 | B2* | 3/2012 | Bruno | G06F 17/30312 707/602 |
| 8,214,351 | B2* | 7/2012 | Dettinger | G06F 17/30979 707/713 |
| 8,612,421 | B2* | 12/2013 | Dombroski | G06F 17/30592 707/713 |
| 2003/0191768 | A1* | 10/2003 | Choy | 707/100 |
| 2004/0250098 | A1* | 12/2004 | Licis | G06F 21/6227 713/193 |
| 2005/0050048 | A1* | 3/2005 | Perez | 707/10 |
| 2005/0131901 | A1* | 6/2005 | Richter | G06F 21/604 |
| 2006/0277594 | A1* | 12/2006 | Chiavegatto | G06F 21/6218 726/2 |
| 2006/0282428 | A1* | 12/2006 | McPherson | G06F 21/62 |
| 2007/0192623 | A1* | 8/2007 | Chandrasekaran | 713/189 |
| 2008/0235193 | A1* | 9/2008 | Hattori | G06F 17/30935 |
| 2009/0019040 | A1* | 1/2009 | Purcell | G06F 17/30483 |
| 2009/0106185 | A1* | 4/2009 | Buhl | G06Q 10/06 |
| 2010/0036831 | A1* | 2/2010 | Vemuri | G06F 17/30516 707/707 |
| 2012/0047117 | A1* | 2/2012 | Nica | G06F 17/30457 707/702 |

* cited by examiner

*Primary Examiner* — Huawen Peng
(74) *Attorney, Agent, or Firm* — Sterne, Kessler, Goldstein & Fox P.L.L.C.

(57) ABSTRACT

Methods, systems and computer-readable storage mediums encoded with computer programs executed by one or more processors for conditional role activation in a database are disclosed. In an embodiment, a request to activate a role for a user of a database system is received, and a predicate for conditional activation of the role is determined. The conditions of the predicate are evaluated, and if the conditions of the predicate are satisfied, the role is activated for the user. If, however, one or more of the conditions of the predicate are not satisfied, the role is not activated for the user.

25 Claims, 4 Drawing Sheets

CONDITIONAL ROLE ACTIVATION IN A DATABASE

TECHNICAL FIELD

Embodiments herein relate generally to role activation in databases.

BACKGROUND

Often, a database may have many users who need to access the database for different purposes. For example, an organization may have different departments or users tasked with performing different functions with regard to the database. For example, users from the payroll department may need to perform payroll functions corresponding to payroll items in the database, the sales teams may need to access and update client and sales data in the database, while administrative users may need to perform particular functions required for maintaining the database, such as data backups. Not all users however need to perform all the possible functions associated with a database, or need access to all the available data on the database. To this end, most databases support the function of roles, which a way to limit how different sets of users access a database. What is needed, however, is a way to further control when or under which conditions a user is allowed to perform the functions of a given role.

BRIEF SUMMARY

Some aspects of the subject matter described in this specification may be embodied in a computer-implemented method. As part of the method, a request to activate a role for a user of a database system is received, and a predicate for conditional activation of the role is determined. The conditions of the predicate are executed, and if the conditions of the predicate are satisfied, the requested role, including the privileges to perform the functions of the database system, is activated for the user. If, however, one or more of the conditions of the predicate are not satisfied, the role is not activated for the user and the user is prevented from performing the functions of the database system associated with the role.

Other embodiments described herein include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present disclosure makes reference to illustrative embodiments for particular applications, it should be understood that the invention is not limited thereto. Other embodiments are possible, and modifications can be made to the embodiments within the spirit and scope of the teachings herein, and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

Databases are commonly used to store data, and are accessed by a variety of users who need to access the database in various capacities to perform different tasks and functions. For example, database administrators may need to access the database to perform database maintenance functions such as equipment upgrades, memory backups, adding/removing user access, etc. Other users, particularly those within different departments of an organization may each have particular tasks (e.g., sales tasks, human resources, accounting, or other tasks) to perform for which they only need access to a portion of the database. Not all users of a database need to necessarily perform all the possible functions with regard to a database or access all the data available on a database.

Figure 1:
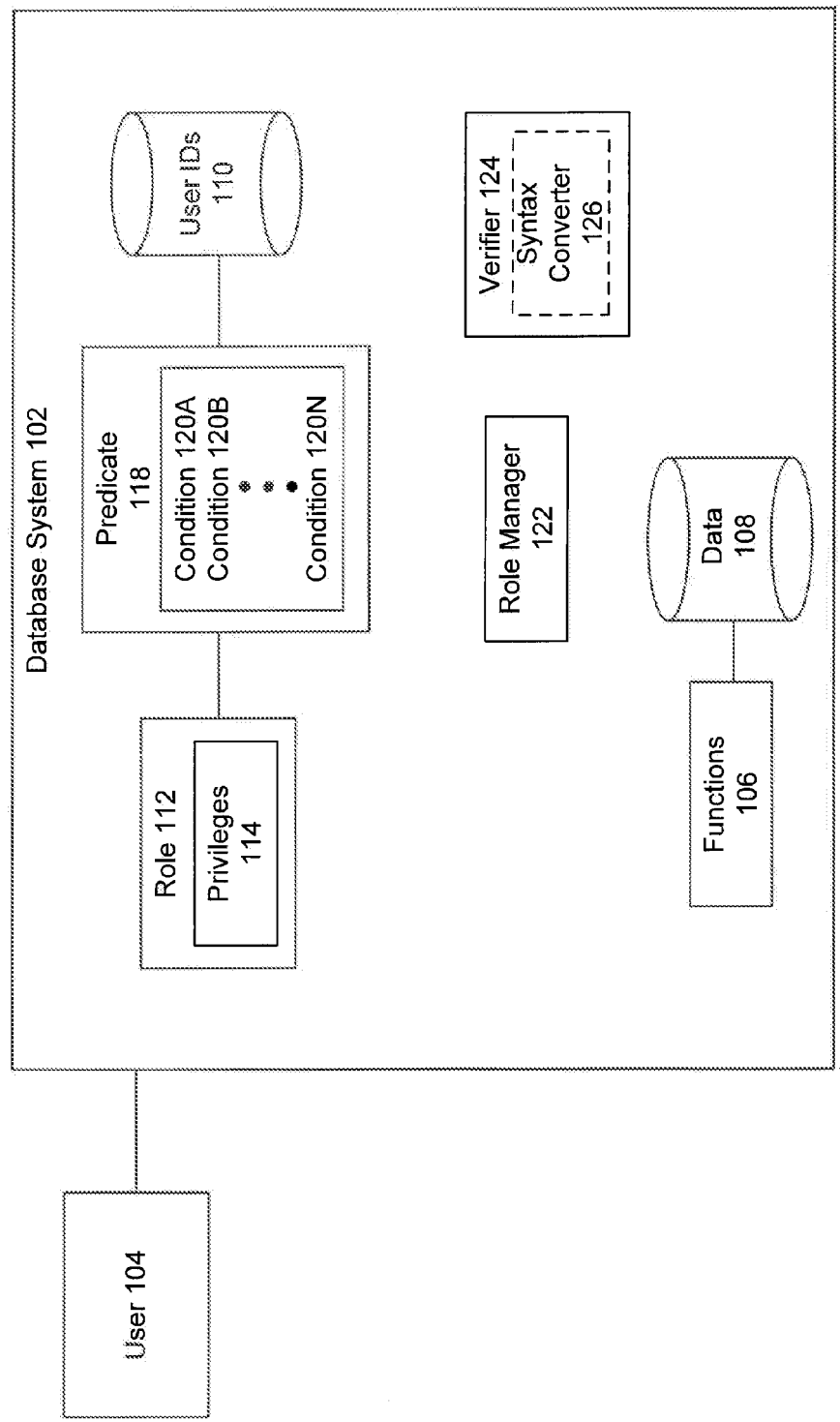
FIG. 1 is a block diagram illustrating a system for performing conditional role activation in a database, according to an embodiment.

FIG. 1 is a block diagram 100 illustrating a system 102 for performing conditional role activation in a database, according to an embodiment. Users 104 may access a database system 102 to perform functions 106 for retrieving, modifying, creating, deleting, or otherwise accessing data 108. As discussed above, not all users 104 need to access all of data 108 or perform all available functions 106.

Database system 102 provides a role 112 for limiting which users 104 can access which functions 106 and which data 108, and under which condition(s) 120A-N role 112 may be activated for users 104. Role 112 may include a collection of one or more privileges 114 that define what functions a user 104 who has been granted that role 112 may or may not perform. Role 112 may be associated with a predicate 118 that includes conditions 120A-N under which the role 112 may be activated for users 104.

Though only one role 112 is shown, in practice database system 102 may have a plurality of roles 112. Each role 112 may have different or overlapping privileges 114. Each role 112 may be assigned to different or overlapping users 104. Each assignment may specify different or overlapping conditions 120 under which user 104 may activate the assigned role 112.

In an embodiment, database system 102 may include a relational database that is managed by one or more administrators (e.g., database administrators). In an embodiment, data 108 may be maintained and accessed by using SQL (structured query language) commands. One or more functions 106 may also be performed by using SQL commands. Data 108 may include any information organized and stored in database system 102. For example, data 108 may be organized into one or more tables and columns and stored as records (e.g., rows) within the tables of database system 102.

Functions 106 include any functions or activities that users 104 may perform with respect to database system 102. Functions 106 may include, for example, reading data 108, creating new data 108, removing or editing existing data 108, backing up data 108, or performing other database access or maintenance functions.

Users 104 may be any individuals or systems that access database system 102. Each user 104 may be associated with a user or login name or identifier (user ID) 110. In an embodiment, users 104 may be grouped or classified in different user groups. For example, users 104 from a particular geographic location or department within an organization may be grouped together into a user group. A particular user group may have its own user ID 110 that is used to refer to the user(s) 104 within the user group. As used herein users 104 and user IDs 110 may be used interchangeably. For example, when a user 104 is granted a role 112 or other access to database system 102, it is understood that the corresponding user ID 110 (i.e., the identifier or login name a user 104 uses to login to database system 102) is granted the role 112 or other access.

Role 112 may be a container by which one or more privileges 114 are grouped and assigned to users 104. In an embodiment, role 112 may include aspects of the ROLE element of SQL with the additional features of allowing for conditional activation of role 112. Further, database system 102 may be able to enforce the conditional activation of role 112 as defined by conditions 120A-N of predicate 118.

SQL is a well-known language used to manage databases. Though database system 102 is directed to embodiments using SQL, one skilled in the art will recognize that other embodiments may include other languages or non-SQL based database systems as well. Using the ROLE element of SQL or similar elements of other languages, database administrators (administrators) may assigns rights or privileges to collections of users.

The ROLE element of SQL may be used to define or specify role-based control for a database. Such role-based control may include indicating what privileges or functions different users may perform with regard to a database system. However, one of the drawbacks of the ROLE element, is that while an administrator may define a ROLE element for particular users, the administrator cannot enforce when or under what conditions the ROLE element is activated for the users. Conventional database systems using only the ROLE element of SQL lack the capability to set conditions on when the ROLE element may be activated and the ability to enforce those conditions.

Role 112 may include capabilities similar to the ROLE elements of SQL. However, according to embodiments, Role 112 is also associated with the additional features of conditional activation and enforceability of the role 112. Role 112 may allow database system 102 to enforce which users may activate which role 112 under conditions 120. For example, when a particular role 112 is requested to be activated, the state of database system 102 may be checked to see if it meets the corresponding conditions 120. If the state of database system 102 does not satisfy conditions 120, role 112 may not be activated for a particular user 104. If, on the other hand, conditions 120 are satisfied by the state of database system 102, role 112 may be activated. Role 112 may not only be associated with assigned rights and privileges 114 accorded to the role 112, but may also include or specify a predicate 118 that defines the circumstances or conditions 120 under which role 112 may be activated by a particular user ID 110.

Privileges 114 may include certain rights to perform functions 106 or access data 108 that are granted or restricted to particular roles 112. Then, when a user 104 is granted a particular role 112, the user 104 may perform the functions 106 and/or access the data 108 specified by privileges 114 of the role 112. For example, the role 112 of db_admin may be granted the privilege 114 of performing database backups (e.g., function 106), but user 104 may only perform backups on Tuesdays between 12:00 am and 4:00 am (which may be provided by conditions 120 of predicate 118). As another example, the role 112 of hr_director may be granted or include the privilege 114 of accessing human resource or employee records in data 108 but user 104 who has been granted role of hr_director 112 may access these records only if connected to the database through a secure network, and may be prevented from accessing these records if using an insecure network.

As mentioned above, role 112 may be associated with one or more conditions 120, which may be grouped into predicate 118. Conditions 120A-N may include any number or combination of conditions, settings, prerequisites, or terms required for a user 104 to activate a particular role 112.

Conditions 120 may include any defined or otherwise verifiable features upon which the activation of role 112 for user 104 is conditioned, including conditions in the alternative. For example, conditions 120 may include conditions based on the time of day, how a user connects to database system 102 (e.g., geographically, type of device, connection speed, connection security), how many other users have connected to database system 102, or how many users 104 have been or are currently assigned a particular role 112. As provided in the example above, the db_admin role 112 may include conditions 120 that the time must be between 12:00 am and 4:00 am for the db_admin role 112 to be activated by a particular user 104 who has been granted the db_admin role 112.

An inherent condition 120 that may exist for role 112 is that the user 104 (e.g., user ID 110) requesting the role 112 must have been previously assigned or granted the role 112. For example, when creating a role 112, the administrator may grant the role 112 to one or more user IDs 110, or alternatively prohibit particular user IDs 110 from being granted the role 112. Then for example, when user 104 requests that a particular role 112 be activated, the first condition 120 that may be checked is whether the corresponding user ID 110 has been granted the role 112 (e.g., the right for role 112 to be activated for user ID 110). Upon a successful grant verification, conditions 120 of predicate 118 may then be verified for conditional activation of role 112.

The condition(s) 120 of a particular role 112 may be grouped together as predicate 118. Predicate 118 may include a grouping of the conditions 120 required to activate a particular role 112 by a particular user 104 (e.g., user ID 110). For example, different users 104 may require different predicates 118 be satisfied to activate the same role 112. Or, for example, multiple users 104 may require the same predicate 118 be satisfied for a particular role 112 to be activated.

An example predicate 118 may include conditions 120A-D for role 112 to be granted to a user A. However, predicate 118 may further specify that while both conditions 120A and 120B must be valid, only one of alternate conditions 120C and 120D must be valid. In a further embodiment, it may be specified that only one of conditions 120C and 120D may be valid, such that if both are found to be 'true', the predicate 118 fails and role 112 cannot be activated for the user A.

In an embodiment, a particular role 112 may be associated with multiple predicates 118 for different users 104. For example, users A, B, C, or D may be granted a role_finance 112 for conditional activation based on predicates 118 A, B, and C. Users A and D may both share predicate A. Predicate A may include conditions 120A and 120B, predicate B may include condition 120B, and predicate C may include conditions 120C and 120D. Then for example, when a request is received for any of users A-D to activate role_finance, one of the predicates A, B, or C associated with the grant to the particular user A, B, C or D, is evaluated by checking the conditions 120.

A role manager 122 may allow an administrator to create or modify role 112. The administrator may name the role 112 define the rights or privileges 114 associated with the role 112, and assign or grant role 112 to various user IDs 110, providing any conditions 120 for role activation. Role manager 122 may also manage or track which users 104 have been granted which role(s) 112 with which predicates 118, and which role(s) 112 have been activated.

The name of role 112 may be whatever role identifier a database administrator decides on for a particular role that accords with whatever naming convention exists within database system 102. Example role names may include but are not limited to db_admin, sales_rep, backup_fx, hr_new_hire, east_coast_sales, role_1112321, etc. As noted above, when role 112 is granted to particular user IDs 110, role 112 may only be (implicitly or explicitly) activated for those users 104 associated with the granted user IDs 110.

A request to activate role 112 for a user 104 may occur either automatically or manually. The automatic request may occur upon the happening of some condition. For example, an automatic request to activate one or more roles 112 for user 104 may occur upon a user login to database system 102 (e.g., using a particular user ID 110). Such conditions for role 112 activation may be stored within conditions 120 or within another portion of database system 102.

A manual request may be initiated by user 104 or another system. For example, user 104 may be logged into database system 102, and may need to access sensitive financial data 108 to perform a particular function 106. User 104 may then manually request the activation of the role 112 with privileges 114 to access the sensitive financial data 108 and perform the function 106.

Upon receipt of a request (either automatic or manual) to activate role 112 to user 104, a verifier 124 verifies that conditions 120 of predicate 118 have been met prior to granting user 104 the requested role 112. Verifier 124 may be any system or systems capable of verifying conditions 120 of predicate 118. As noted above, verifier 124 may first verify whether the user 104 associated with a request to activate role 112 has been granted role 112. If user 104 has not been granted role 112, then database system 102 may display an error message to user 104 indicating that the user is not authorized or is otherwise unable to activate role 112.

If user 104 has been granted role 112, verifier 124 may process and verify that predicate 118 has been satisfied prior to activating privileges 114 of role 112 for user 104. In an embodiment, verifier 124 may check conditions 120 until all conditions 120 necessary to satisfy predicate 118 have been verified as being satisfied, or until one or more of the conditions 120 fails. Upon the failing of any condition 120, user 104 may be notified of the particularities or reasons for failure or may otherwise be notified generally that role 112 cannot be activated at this time. In another embodiment, verifier 124 may process all conditions 120, even if one or more conditions 120 have been identified as failing.

A syntax converter 126 may convert, apply, process or generate any additional syntax, as necessary, to allow verifier 124 to execute and verify one or more conditions 120 of predicate 118. As noted above, database system 102 may receive SQL commands for accessing data 108 and performing functions 106. As will be discussed in greater detail below, the syntax for creating conditions 120 may be by using one or more of "WHERE" clauses in SQL. However, WHERE clauses by themselves may not be enough to generate a true/false statement as to whether a particular condition 120 or all the conditions 120 are satisfied when executed. As such, syntax converter 126 may convert, process or generate additional SQL as may be necessary to execute conditions 120. For example, syntax converter 126 may apply a SELECT or SELECT 1 statement in SQL around one or more conditions 120 of predicate 118. Verifier 124 may then execute the SELECT clause(s) including condition(s) 120 to determine if predicate 118 has been satisfied.

Example syntax for creating role 112 may include:
CREATE ROLE <role_name>

In the example syntax, <role_name> indicates the name of the role 112. The <role_name> may be provided or entered by the administrator, or may otherwise be provided or assigned.

Example syntax for granting role 112 may include:
GRANT ROLE <role_name> [WHERE <predicate>] TO <userID>

In the example syntax, <predicate> identifies the predicate 118 or conditions 120 necessary to exist for the identified role 112 to be activated by userID. <UserID> identifies any user IDs 110 specifically assigned to or prohibited from having the ability to have role_name activated.

In an embodiment, a role may be created and granted with a single line or command of syntax.

An example of granting role 112 with a predicate is as follows:
GRANT ROLE oper_role
WHERE datepart(hour, current_time( )) not between 8 and 18
TO Bob In the example, the privileges of oper_role can only be activated by a user (e.g., user ID 110) Bob if the time is not between 8-18 (e.g., 8 am and 6 pm). As such, database system 102 can enforce a policy that privileges 114 of oper_role, which may include database maintenance functions 106, only occur during off-peak hours of database usage (e.g., during the hours of 6:01 pm and 7:59 am).

An example of requesting role 112 to be activated may is as follows:
SET ROLE <role_name> ON When verifier 124 encounters the SET ROLE statement in SQL, verifier 124 may execute or verify predicate 118 associated with the role 112 role_name. If conditions 120 are satisfied, role_name may be activated for whichever user 104 account from which the SET ROLE statement is received or detected.

Figure 2:
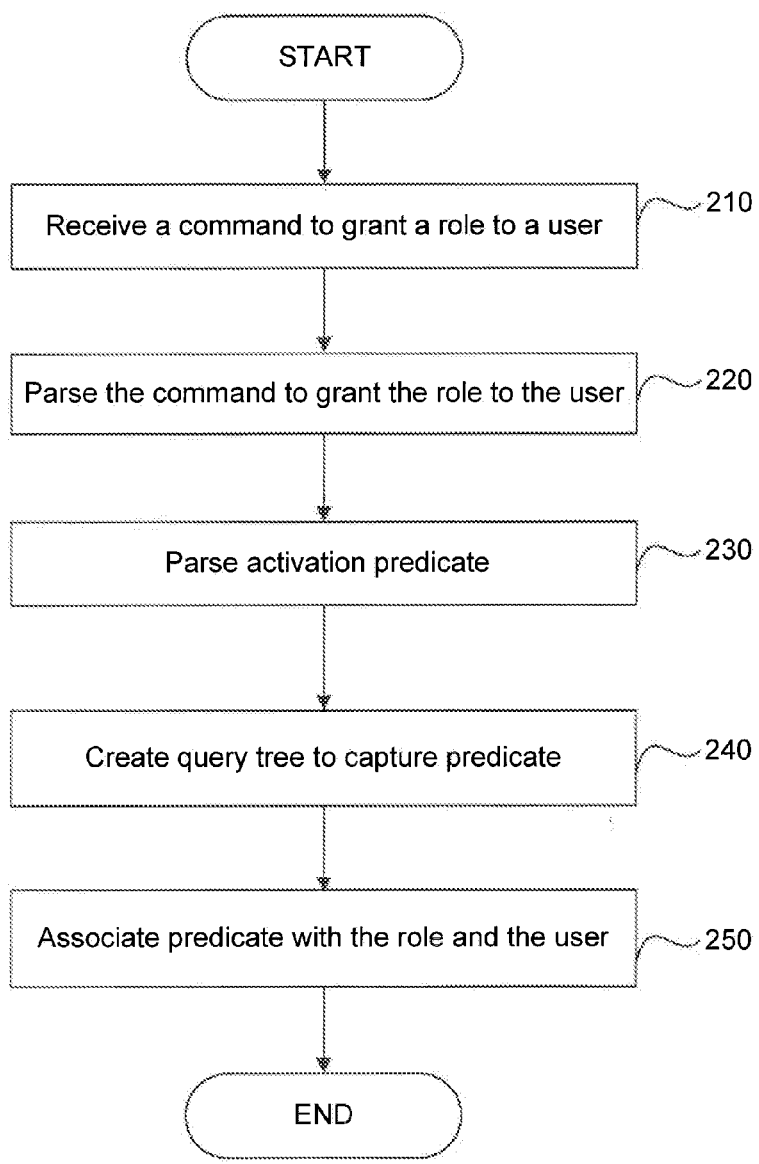
FIG. 2 is a flow chart of a process of granting a role for conditional role activation in a database, according to an example embodiment.

FIG. 2 is a flow chart of a process of granting a role for conditional activation in a database, according to an example embodiment. The stages of FIG. 2 are described below, in non-limiting examples, with reference to FIG. 1. However, the flowchart of FIG. 2 is not limited to the example embodiment of FIG. 1.

At stage 210, a command to grant a role to a user is received. For example, role manager 122 may receive a GRANT ROLE command from an administrator of database system 102. The GRANT ROLE command may specify the name of a role 112 and conditions 120 for predicate 118. The GRANT ROLE command may further specify to which user (s) 104 (e.g., user ID(s) 110) the role 112 is to be granted.

At stage 220, a command to grant the role to the user is parsed. For example, the GRANT ROLE command may be parsed to determine the name of a particular role 112 identified in the command. Further, role manager 122 may determine predicate 118 (i.e., conditions 120A-N) associated with role 112 and user 104 (e.g., user ID 110). For example, role manager 122 may parse or extract conditions 120A-N from predicate 118. In an embodiment, role manager 122 may perform an syntactic evaluation on conditions 120A-N.

At stage 230, the predicate is parsed. For example, syntax converter 126 may parse activation predicate 118 using rules for parsing a SQL WHERE clause. As noted above, SQL WHERE clause is only one example of how conditions 120 of predicate 114 may be defined. One WHERE clause may be used to define multiple conditions 120.

At stage 240, a query tree is created to capture the predicate. For example, syntax converter 126 may create a query tree of how verifier 124 is to execute conditions 120 of predicate 118. For example, the query tree may include an ordered set of conditions 120 written in executable SQL. In an embodiment, query tree may be ordered in a most efficient to execute manner. For example, the most easily verifiable conditions 120 may be ordered earlier than those that may require more resources to be verified. In an embodiment, the query tree may be created (i.e., stage 240) may be performed simultaneously with parsing the predicate (i.e., stage 230).

At stage 250, the predicate is associated with the role and the user. For example, predicate 118, including the query tree of conditions 120, may be saved in a table of database system 102. Then for example, the predicate identifier (identifying predicate 118) may be associated with role 112. The association may then cause verifier 124 to verify conditions 120 of predicate 118 associated with role 112 whenever a SET ROLE statement identifying role 112 is received requesting activation of role 112 for a particular user 104 or when role 112 is automatically activated for user 104.

Figure 3:
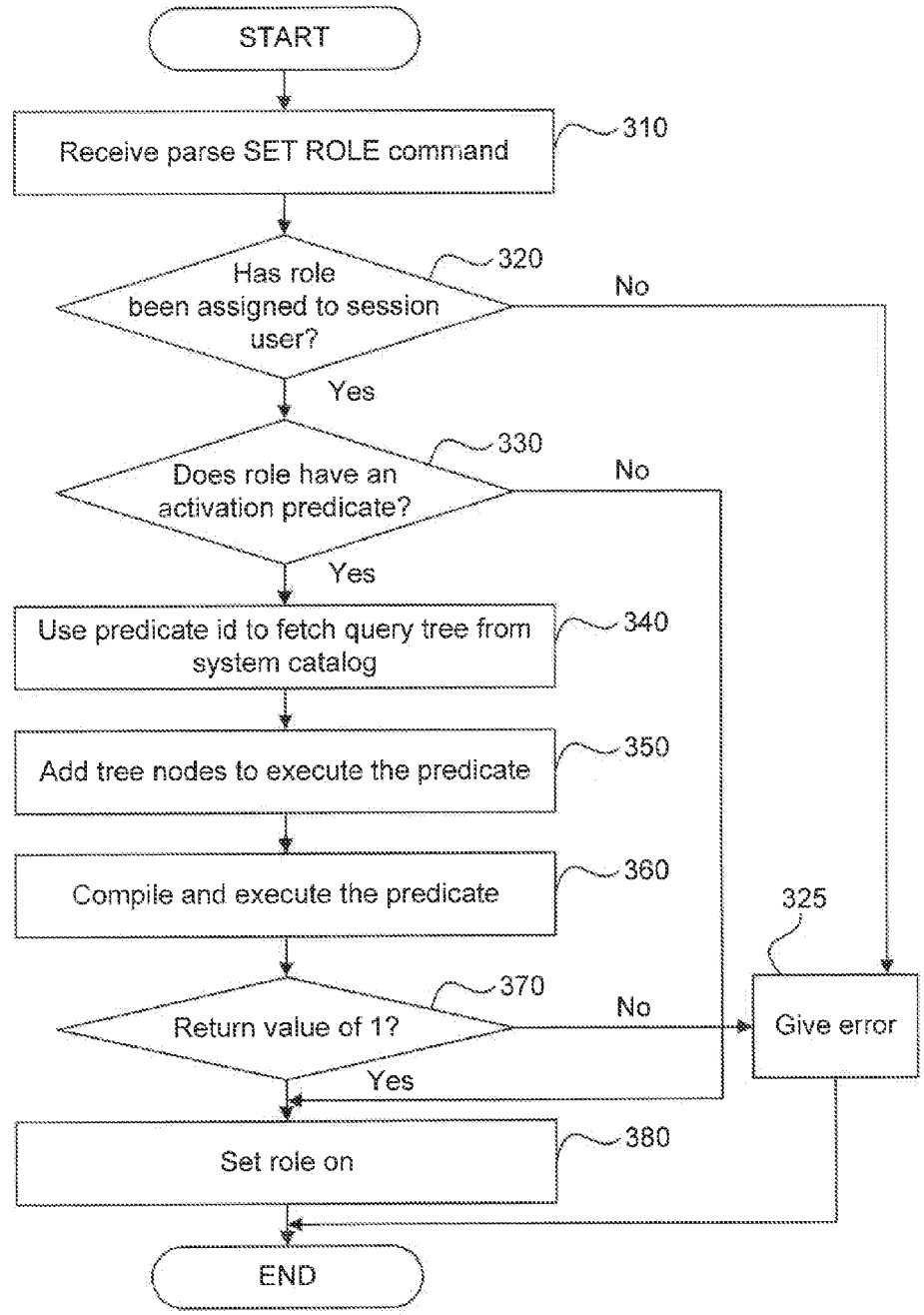
FIG. 3 is a flow chart of a process of performing conditional role activation in a database, according to an example embodiment.

FIG. 3 is a flowchart of a method for performing conditional role activation in a database, according to an embodiment. For example, after role 112 has been granted to user 104 and an associated predicate 118 has been saved (as described above with respect to FIG. 2), the role 112 may be activated for a particular user 104. In the example of FIG. 3, a request to activate the role 112 may begin with a SET ROLE statement. The stages of FIG. 3 are described below, in non-limiting examples, with reference to FIG. 1. However, the flowchart of FIG. 3 is not limited to the example embodiment of FIG. 1.

At stage 310, a SET ROLE command is received and parsed. For example, as discussed above the SET ROLE command may be used to request an activation of a role 112.

At stage 320, it is determined whether the role has been assigned to a session user. For example, verifier 124 may determine whether a GRANT ROLE statement has assigned role 112 to a particular user 104 (e.g., user ID 110) for which the SET ROLE statement is received.

If the role has not been assigned to the user, at stage 325 an error message is displayed. The error message may indicate to the user 104 that the role 112 being requested was not assigned to the user 104.

At stage 330, if the role has been assigned to the user 104, it is checked as to whether the role has an activation predicate. If role 112 does not have an activation predicate 118, then processing continues to stage 380, at which point role 112 is activated for the requesting user 104.

If the role has an activation predicate, at stage 340, the query tree is fetched using the predicate identifier. For example, each predicate 118 may have its own identifier (predicate id) that is used to identify the predicate 118. The predicate id may allow a single predicate 118 to be used for activation of multiple roles 112. As noted above, a query tree of conditions 120 may be generated and stored in database system 102. The query tree may associated with the predicate id of the requested role 112 is fetched from a system catalog or other storage.

At stage 350, tree nodes are added to execute the predicate. For example, syntax converter 126 may add the SQL SELECT 1 statement to predicate 118. Then for example, if conditions 120 of predicate 118 each are true or verified, a 1 is returned as a result of executing the SELECT 1 statement. Otherwise a 0 is returned if one or more of conditions 120 is found to be false.

At stage 360, the predicate is compiled and executed. For example, the syntax (i.e., SQL syntax or commands) added to conditions 120 may be compiled and executed. The result of the execution may be returning a 1 or a 0 as a result of the SELECT 1 clause.

At stage 370, if the value of 1 is returned, processing continues to stage 380. Otherwise an error message is provided at stage 325 indicating that one or more of the conditions 120 failed.

At stage 380, the role is activated for a user. For example, the SET role_name ON SQL statement may be executed, thus activating role 112 for the requesting user 104.

Figure 4:
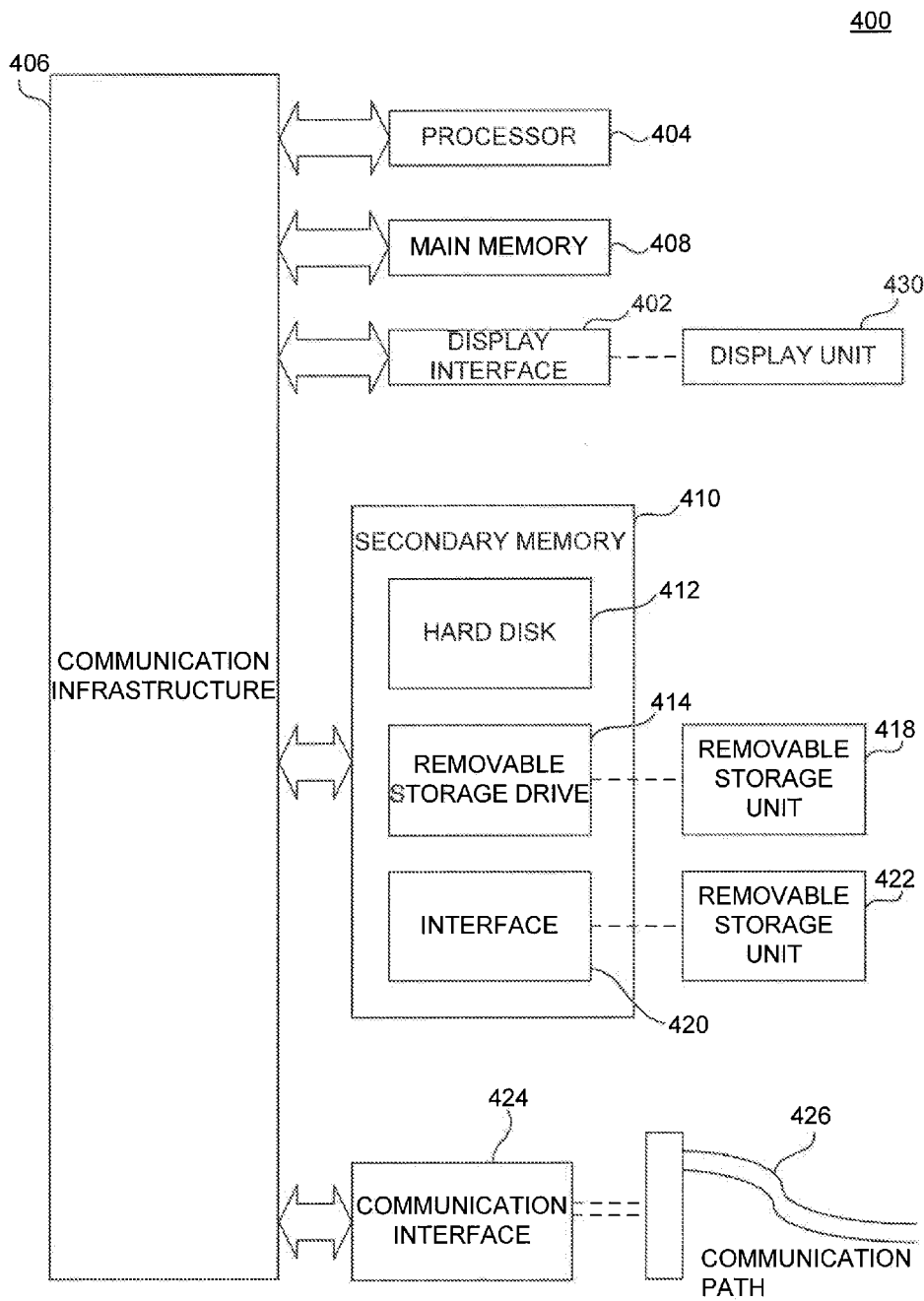
FIG. 4 is a system diagram that can be used to embody or implement embodiments described herein.

FIG. 4 illustrates an example computer system 400 in which embodiments as described herein, or portions thereof, may be implemented as computer-readable code. For example, database system 102, and methods 200 and 300, or portions thereof, may be implemented in computer system 400 using hardware, software, firmware, tangible computer readable media having instructions stored thereon, or a combination thereof, and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the embodiments using other computer systems and/or computer architectures. Although some operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system may be operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Main memory 408 may include any kind of tangible memory. Secondary memory 410 may include, for example, a hard disk drive 412, and a removable storage drive 414. Removable storage drive 414 may include a floppy disk drive, a magnetic tape drive, an optical disk drive, a flash memory, or the like. The removable storage drive 414-reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored therein computer software and/or data.

Computer system 400 (optionally) includes a display interface 402 (which can include input and output devices such as keyboards (e.g., 104), mice, etc.) that forwards graphics, text, and other data from communication infrastructure 406 (or from a frame buffer not shown) for display on display unit 430.

In alternative implementations, secondary memory 410 may include other similar I/O ways for allowing computer programs or other instructions to be loaded into computer system 400, such as a removable storage unit 422 and an interface 420. Examples may include a program cartridge and cartridge interface (such as that found in video game devices), a removable memory chip (such as an EPROM (erasable programmable read only memory), or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of storage-incapable signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 418, removable storage unit 422, and a hard disk installed in hard disk drive 412. Computer storage medium and computer readable storage medium may also refer to memories, such as main memory 408 and secondary memory 410, which may be memory semiconductors (e.g. DRAMs (dynamic random access memory), etc.). Such mediums include non-transitory storage mediums.

Computer programs (also called computer control logic) are stored in main memory 408 and/or secondary memory 410. Computer programs may also be received via communications interface 424. Such computer programs, when executed, enable computer system 400 to implement embodiments as discussed herein. Where the embodiments are implemented using software, the software may be stored in a computer program product and loaded into computer system 400 using removable storage drive 414, interface 420, and hard disk drive 412, or communications interface 424.

Embodiments also may be directed to computer program products comprising software stored on any computer readable medium. Such software, when executed in one or more data processing device, causes a data processing device(s) to operate as described herein. Embodiments may employ any computer readable storage medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS (microelectromechanical systems), nanotechnological storage device, etc.).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Summary and Abstract sections may set forth one or more but not all exemplary embodiments contemplated, and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described examples, but should be defined only in accordance with the following claims and their equivalents.

What is claimed is:

1. A computer-implemented method, comprising:
   receiving, by a database that enforces which users may activate which roles for the database, a request to activate a role for a first user of the database, the role corresponding to one or more privileges associated with functions of the database;

determining, by the database, that a predicate for conditional activation of the role using a ROLE element of SQL (structured query language) was defined and stored in the database prior to receiving the request, wherein a first predicate includes one or more conditions that must be satisfied for the role to be activated for the first user, and wherein a second predicate includes one or more conditions different from the first predicate that must be satisfied for the role to be activated for a second user of the two or more users;

evaluating the conditions of the first predicate by the database, wherein the database determines whether the conditions of the first predicate are satisfied;

if the conditions of the first predicate are satisfied, activating, by the database, the role for the user, wherein the activating enables the first user to perform the functions of the database associated with the role; and if one or more of the conditions of the first predicate are not satisfied, not activating, by the database, the role for the first user, wherein the not activating prevents the first user from performing the functions of the database associated with the role.

2. The computer-implemented method of claim 1, further comprising:

receiving a request to grant the role in the database;

receiving, as part of the request, the conditions and one or more users associated with the role;

generating the first predicate in the database system, the first predicate including the conditions; and creating, in the database, an association between the role and one or more of the users.

3. The computer-implemented method of claim 1, wherein the receiving comprises:

determining whether the first user is associated with the role in the database, wherein if the first user is not associated with the role, the role is not activated for the first user.

4. The computer-implemented method of claim 3, further comprising:

determining that the first user is not associated with role in the database; and providing an error message to the first user indicating that the role was not activated for the first user.

5. The computer-implemented method of claim 1, wherein the determining the predicate comprises:

determining that the first predicate includes one or more conditions that must be satisfied for the role to be activated for the first user and a third user.

6. The computer-implemented method of claim 1, wherein the receiving comprises:

receiving the request either automatically upon a login of the first user to the database or manually based upon a request from the first user.

7. The computer-implemented method of claim 1, wherein the receiving comprises:

determining that the request includes a structured query language (SQL) statement, including a WHERE clause indicating the one or more conditions of the first predicate.

8. The computer-implemented method of claim 1, wherein two or more users are associated with each of the predicates and the role, wherein at least one of the predicates includes two or more conditions.

9. The computer-implemented method of claim 1, wherein the role both grants the first user privileges to perform the one or more functions associated with the role and explicitly restricts one or more additional privileges from the first user for performing one or more prohibited functions associated with the database.

10. The computer-implemented method of claim 1, wherein the receiving comprises:

receiving the request to grant a plurality of roles to the first user.

11. The computer-implemented method of claim 1, wherein the database comprises a relational database including one or more SQL functions used to perform the evaluating.

12. The computer-implemented method of claim 1, wherein if the ROLE is not defined for a third user in the database prior to receiving the request, then the ROLE is not activated for the third user, and wherein the ROLE is defined for the first user prior to receiving the request.

13. The computer-implemented method of claim 1, wherein determining that a predicate for conditional activation of the role using a ROLE element comprises determining whether the first user is accessing the database using a secure or insecure connection, wherein if the first user is accessing the database using a secure connection, the role is activated for the first user, and wherein if the first user is accessing the database using an insecure connection the role is not activated for the first user.

14. The computer-implemented method of claim 1, wherein the role comprises an administrative role with regard to the database, wherein a user having the administrative roll logs directly into the database.

15. The computer-implemented method of claim 1, wherein the system state comprises a current time, wherein a ROLE element of SQL corresponding to the role is only activated for the first user during a specifically defined time interval during a day as measured by the current time, wherein the role is not activated for the first user during any other time interval.

16. A database, comprising:

a role manager implemented on a processor that when executed by the processor is configured to:

receive, by the database that enforces which users may activate which roles for the database, a request to activate a role for a first user of the database, the role corresponding to one or more privileges associated with functions of the database;

determine, by the database, that a predicate for conditional activation of the role using a ROLE element of SQL (structured query language) was defined and stored in the database prior to receiving the request, wherein a first predicate includes one or more conditions that must be satisfied for the role to be activated for a first user, and wherein a second predicate includes one or more conditions different from the first predicate that must be satisfied for the role to be activated for a second user of the two or more users; and a verifier configured to:

evaluate the conditions of the first predicate by the database, wherein the database determines whether the conditions of the first predicate are satisfied;

wherein conditions of the first predicate are satisfied, activating, by the database, the role for the first user, wherein the activating enables the first user to perform the functions of the database associated with the role, and wherein if one or more of the conditions of the predicate are not satisfied, not activating, by the database, the role for the first user, wherein the not activating prevents the first user from performing the functions of the database associated with the role.

17. The database of claim 16, wherein the role manager is further configured to:
   receive a request to create the role in the database;
   receive, as part of the request, the conditions and one or more users associated with the role;
   generate the predicate in the database, the predicate including the received conditions;
   create the role in the database, including an association between the role and one or more of the users.

18. The database of claim 16, wherein the role manager is further configured to:
   determine that the first user is associated with the role in the database, wherein if the first user is not associated with the role, the role manager does not activate the role for the first user.

19. The database of claim 16, wherein the role manager is further configured to:
   determine that the first predicate includes one or more conditions that must be satisfied for the role to be activated for the first user and a third user.

20. The database of claim 16, wherein the role manager is further configured to:
   receive the request either automatically upon a login of the first user to the database or manually based upon a request from the first user.

21. The computer-implemented method of claim 16, wherein the verifier is further configured to:
   determine that the request includes a structured query language (SQL) statement, including a WHERE clause indicating the one or more conditions of the first predicate.

22. The computer-implemented method of claim 16, wherein the verifier is further configured to:
   generate a SQL SELECT statement based on the conditions of the first predicate.

23. A computer program product comprising tangible memory accessible to one or more processors, the memory comprising code that when executed cause the one or more processors to perform operations comprising:
   receiving, by a database that enforces which users may activate which roles for the database, a request to activate a role for a first user of the database, the role corresponding to one or more privileges associated with functions of the database;
   determining, by the database, that a predicate for conditional activation of the role using a ROLE element of SQL (structured query language) was defined and stored in the database prior to receiving the request, wherein a first predicate includes one or more conditions that must be satisfied for the role to be activated for the first user, and wherein a second predicate includes one or more conditions different from the first predicate that must be satisfied for the role to be activated for a second user of the two or more users;
   evaluating the conditions of the first predicate by the database, wherein the database determines whether the conditions of the first predicate are satisfied;
   if the conditions of the predicate are satisfied, activating, by the database, the role for the first user, wherein the activating enables the first user to perform the functions of the database associated with the role; and
   if one or more of the conditions of the predicate are not satisfied, not activating, by the database, the role for the first user, wherein the not activating prevents the first user from performing the functions of the database associated with the role.

24. The computer program product of claim 23, the operations further comprising:
   receiving a request to grant the role in the database;
   receiving, as part of the request, the conditions and one or more users associated with the role;
   generating the predicate in the database, the predicate including the conditions; and
   creating, in the database, an association between the role and one or more of the users.

25. The computer program product of claim 23, the operations further comprising:
   determining that the request includes a structured query language (SQL) statement, including a WHERE clause indicating the one or more conditions of the first predicate.

* * * * *